United States Patent
E et al.

(10) Patent No.: US 9,815,948 B2
(45) Date of Patent: Nov. 14, 2017

(54) MAGNETIC RESIN COMPOUND, METHOD FOR PREPARING THE SAME, AND USE THEREOF

(71) Applicant: CHINA PETROLEUM & CHEMICAL CORPORATION, Beijing (CN)

(72) Inventors: Hongjun E, Beijing (CN); Heju Zhu, Beijing (CN); Xiuhua Sui, Beijing (CN); Pengfei Liao, Beijing (CN); Leilei Hu, Beijing (CN)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 14/896,512

(22) PCT Filed: Oct. 13, 2014

(86) PCT No.: PCT/CN2014/088492
§ 371 (c)(1),
(2) Date: Dec. 7, 2015

(87) PCT Pub. No.: WO2015/055105
PCT Pub. Date: Apr. 23, 2015

(65) Prior Publication Data
US 2016/0152778 A1    Jun. 2, 2016

(30) Foreign Application Priority Data
Oct. 17, 2013    (CN) .......................... 2013 1 0488487

(51) Int. Cl.
*C08G 83/00*    (2006.01)
*C10M 149/22*    (2006.01)
(Continued)

(52) U.S. Cl.
CPC ......... *C08G 83/004* (2013.01); *C08G 73/028* (2013.01); *C08G 83/00* (2013.01);
(Continued)

(58) Field of Classification Search
CPC .... C08G 83/004; C08G 73/028; C08G 83/00; C10M 139/04; C10M 155/02; C10M 149/22; C10M 2215/02; H01F 1/445
See application file for complete search history.

(56) References Cited

FOREIGN PATENT DOCUMENTS

| CN | 101955231 A | 1/2011 |
|---|---|---|
| CN | 102058891 A | 5/2011 |

(Continued)

OTHER PUBLICATIONS

International Search Report (PCT/ISA/210) dated Jan. 8, 2015, by the State Intellectual Property Office of China as the International Searching Authority in International Application No. PCT/CN2014/088492.

(Continued)

*Primary Examiner* — Taiwo Oladapo
(74) *Attorney, Agent, or Firm* — Buchanan Ingersoll & Rooney PC (57) ABSTRACT

Disclosed is a magnetic dendrimer compound and a method for preparing the magnetic dendrimer compound, the molecular formula of which is shown in formula (I): $\Gamma(CH_2)_3 \ N_{(2^{n+1}-1)} R^1_{(2^{n+2}-2)} R^2_{(2^{n+1})}$ (I). In this formula, $\Gamma$ indicates magnetic particles coated with $SiO_2$ on a surface thereof, the magnetic particles having been modified by a silane coupling agent; $(CH_2)_3 N_{(2^{n+1}-1)} R^1_{(2^{n+2}-2)}$ is a dendritic group, and $R^2_{(2^{n+1})}$ is a lipophilic group, with $0 \leq n \leq 100$. Further disclosed is a lubricant comprising the magnetic dendrimer compound.

23 Claims, 3 Drawing Sheets

(51) Int. Cl.
*C10M 139/04* (2006.01)
*C10M 155/02* (2006.01)
*C08G 73/02* (2006.01)
*H01F 1/44* (2006.01)

(52) U.S. Cl.
CPC ........ *C10M 139/04* (2013.01); *C10M 149/22* (2013.01); *C10M 155/02* (2013.01); *H01F 1/445* (2013.01); *C10M 2215/02* (2013.01)

(56) References Cited

FOREIGN PATENT DOCUMENTS

| | | | |
|---|---|---|---|
| CN | 102489269 A | * | 6/2012 |
| CN | 102489273 A | * | 6/2012 |
| WO | WO 2009/126835 A2 | | 10/2009 |

OTHER PUBLICATIONS

Written Opinion (PCT/ISA/237) dated Jan. 8, 2015, by the State Intellectual Property Office of China as the International Searching Authority in International Application No. PCT/CN2014/088492.

* cited by examiner

MAGNETIC RESIN COMPOUND, METHOD FOR PREPARING THE SAME, AND USE THEREOF

RELATED APPLICATION

This application is a national stage entry of PCT/CN2014/088492, filed Oct. 13, 2014 which claims priority of Chinese Patent Application No. 201310488487, filed Oct. 17, 2013, which are incorporated by reference in their entirety.

FIELD OF THE INVENTION

The present disclosure relates to a magnetic resin compound, specifically to a magnetic resin compound that can be used as a magnetic nano anti-wear additive in a lubricating oil and a method for preparing the magnetic resin compound, and in particular, to a magnetic polyamido-amine compound and a method for preparing the magnetic polyamidoamine compound.

BACKGROUND OF THE INVENTION

In recent years, with the all-round upgrading of industrial products, especially automatic industrial products, there is an increasing demand for the performance of a lubricant. Newly enacted environment protection laws and regulations have put forward strict restrictions on the using amount of a lubricating oil additive containing sulfur, phosphor, or chorine. At present, conventional anti-wear agents for lubricating oils include sulfur-based anti-wear agents (e.g., sulfurized alkenes, vulcanized esters, and vulcanized oils), phosphorous-based anti-wear agents (e.g., phosphates, phosphites, and alkyl phosphonates), halogen-based anti-wear agents (chlorinated paraffins, chlorohydrocarbons, and chlorinated fatty acids), organic metal anti-wear agents (lead naphthenates and dialkyldithiophosphates (ZnDDP)), etc.

With the rapid development of modern industry, and the constant improvement of people's health consciousness and their demands for the environment, it will be increasingly difficult for theses conventional anti-wear agents to satisfy harsh operating conditions and the requirements generated in the development of times. For instance, use of chlorine-based anti-wear agents, due to the toxicity thereof, has already been prohibited in some regions, such as the U.S. and Western Europe. Lead naphthenate is also being eliminated gradually due to issues of ecology and toxicity. Use of sulfur- and phosphorous-based anti-wear agents and ZnDDP, have already been internationally limited because the phosphorous or sulfur contained therein would poison a three-way catalyst in an exhaust gas converter, affect measurement accuracy of an oxygen sensor, and produce toxicity to the ecological environment.

It is exactly these enormous challenges confronted by conventional anti-wear agents for lubricating oils that have brought forth a research hotspot into nanomaterials as anti-wear agents for lubricating oils. Nanomaterials are new materials developed since the mid-1980s, and have extraordinary features different from those of any microcosmic atoms, molecules, or any macroscopic substances. New lubricating materials prepared based on nanomaterials, as lubricating oil additives, achieve anti-friction and anti-wear functions based on the characteristics of the nanoparticles per se, and contribute to tribology performance in a different manner from conventional lubricating oil additives which take advantages of structural features thereof to achieve anti-friction and anti-wear functions. Due to small granularity of nanoparticles, they get to a friction surface more easily, which facilitates formation of a thicker surface film. The surfaces of a friction pair can thus be better separated, thereby improving anti-friction and anti-wear effects.

A dendrimer is a highly branched three-dimensional molecule having a rather regular and controllable structure, and a large number of functional end groups. The concept of synthesizing dendrimers through gradual repetition was first reported by Vogtle et al. in 1978, followed by actual synthesis of dendrimers by the Tomalia group. Since then, dendrimers have become scientists' focus of attention. The molecule per se is nano-scaled, and the molecular weight distribution thereof can reach monodispersity, and meanwhile, a dendrimer has amino functional groups that increase geometrically and can be readily modified on a surface thereof. These structural features render it possible to effectively disperse the dendrimer in a lubricating oil, thus satisfying basic requirements of a nano additive for lubricating oils. However, a dendrimer used as an anti-wear additive for lubricating oils has not yet been reported so far.

SUMMARY OF THE INVENTION

One purpose of the present disclosure is to provide a new magnetic dendrimer compound.

A further purpose of the present disclosure is to provide a method for preparing the new magnetic dendrimer compound.

A still further purpose of the present disclosure is to provide use of the new magnetic dendrimer compound in a magnetic anti-wear additive for lubricating oils.

In order to achieve the purposes of the present disclosure, the following technical solutions are provided.

1) A magnetic dendrimer compound, having a molecular formula as shown in formula(I):

$$\Gamma(CH_2)_3 N_{(2^{n+1}-1)} R^1_{(2^{n+2}-2)} R^2_{(2^{n+1})} \quad (I),$$

wherein $\Gamma$ indicates a magnetic particle coated with $SiO_2$ on a surface thereof, the magnetic particle having been modified by a silane coupling agent, wherein $(CH_2)_3 N_{(2^{n+1}-1)} R^1_{(2^{n+2}-2)}$ is a dendritic group, and wherein $R^2_{(2^{n+1})}$ a lipophilic group, with $0 \leq n \leq 100$.

2) In one embodiment of the magnetic dendrimer compound according to item 1) of the present disclosure, the magnetic particle is a magnetic nanoparticle.

3) In one embodiment of the magnetic dendrimer compound according to item 1) or 2) of the present disclosure, $0 \leq n \leq 10$.

4) In one embodiment of the magnetic dendrimer compound according to any one of items 1)-3) of the present disclosure, the magnetic particle comprises at least one selected from a group consisting of $Fe_3O_4$, Ni, and $\gamma\text{-}Fe_2O_3$.

5) In one embodiment of the magnetic dendrimer compound according to any one of items 1)-4) of the present disclosure, the magnetic particle is selected from core-shell $Fe_3O_4 \& SiO_2$ magnetic nanoparticles coated with $SiO_2$ on an outer shell thereof, said magnetic particle having been modified by a silane coupling agent.

6) In one embodiment of the magnetic dendrimer compound according to any one of items 1)-5) of the present disclosure, the silane coupling agent is 3-aminopropyl triethoxysilane, 3-glycidyloxypropyl trimethoxysilane, or 3-aminopropyl trimethoxysilane.

7) In one embodiment of the magnetic dendrimer compound according to any one of items 1)-6) of the present disclosure, $R^1$ is selected from polyamidoamine dendrimer macromolecules having a repetitive structure unit as shown in formula (II):

$$—(CH_2)_2CONH(CH_2)_2NH— \quad (II).$$

8) In one embodiment of the magnetic dendrimer compound according to any one of items 1)-7) of the present disclosure, $R^2$ is selected from a group consisting of linear or branched $C_{1-18}$ alkyls.

The magnetic dendrimer compound of the present disclosure is preferably a magnetic polyamidoamine compound having the molecular formula as shown in formula (III). That is, the dendrimer is a polyamido-amine dendrimer macromolecular compound (PAMAM):

$$\Gamma(CH_2)_3N_{(2^{n+1}-1)}[(CH_2)_2CONH(CH_2)_2NH]_{(2^{n+2}-2)}$$
$$(C_mH_{2m+1})_2^{n+1} \quad (III),$$

wherein, $\Gamma$ represents a magnetic nanoparticle with particle size in the range from 1 nm to 100 nm, and $0 \le n \le 10$ and $1 \le m \le 18$. Preferably, the magnetic nanoparticle $\Gamma$ comprises at least one selected from a group consisting of $Fe_3O_4$, Ni, and $\gamma$-$Fe_2O_3$, and is coated with $SiO_2$ on an outer shell thereof, thereby constituting a core-shell $Fe_3O_4\&SiO_2$ magnetic nanoparticle. Most preferably, the core-shell $Fe_3O_4\&SiO_2$ magnetic nanoparticle is modified by a silane coupling agent, which can, for example, be 3-aminopropyl triethoxysilane, 3-glycidyloxypropyl trimethoxysilane, 3-aminopropyl trimethoxysilane, or the like.

Specifically, the magnetic dendrimer compound can be preferably selected from a group consisting of zero generation poly magnetic dendrimer compounds (G0, n=0, and $1 \le m \le 18$), first generation magnetic dendrimer compounds (G1, n=1, and $1 \le m \le 18$), second generation magnetic dendrimer compounds (G2, n=2, and $1 \le m \le 18$), third generation magnetic dendrimer compounds (G3, n=3, and $1 \le m \le 18$), fourth generation magnetic dendrimer compounds (G4, n=4, and $1 \le m \le 18$), fifth generation magnetic dendrimer compounds (G5, n=5, and $1 \le m \le 18$), sixth generation magnetic dendrimer compounds (G6, n=6, and $1 \le m \le 18$), seventh magnetic dendrimer compounds (G7, n=7, and $1 \le m \le 18$), eighth generation magnetic dendrimer compounds (G8, n=8, and $1 \le m \le 18$), ninth generation magnetic dendrimer compounds (G9, n=9, and $1 \le m \le 18$), and tenth generation magnetic dendrimer compounds (G10, n=10, and $1 \le m \le 18$).

9) A method for preparing the magnetic dendrimer compound according to any one of items 1)-8) of the present disclosure, comprising the following steps:

step i): providing a magnetic particle coated with $SiO_2$;

step ii) modifying a surface of the magnetic particle with a silane coupling agent, and reacting a modified product with the dendrimer, so as to bond the dendrimer to the magnetic particle; and step iii) reacting a product of the dendrimer bonded to the magnetic particle that has been obtained in step ii) with a compound having a lipophilic group, to produce the magnetic dendrimer compound.

10) In one embodiment of the method according to item 9) of the present disclosure, the compound having a lipophilic group is a halohydrocarbon, preferably a haloalkane, and more preferably a monoiodoalkane.

11) Use of the magnetic dendrimer compound according to any one of items 1)-8) of the present disclosure in preparation of an anti-wear additive for lubricating oils.

12) A lubricant comprising the magnetic dendrimer compound according to any one of items 1)-8) of the present disclosure.

13) In one embodiment of the lubricant according to item 12) of the present disclosure, the content of the magnetic dendrimer compound in the lubricant is in the range from 100 ppm to 5 wt %.

14) In one embodiment of the lubricant according to item 12) or 13) of the present disclosure, the content of Fe and/or Ni in the lubricant is in the range from 0.01 ppm to 0.20% by weight, preferably 0.01 ppm to 429 ppm by weight.

15) In one embodiment of the lubricant according to any one of items 12)-14) of the present disclosure, the content of Si in the lubricant is in the range from 0.01 to 20.1 ppm by weight.

16) In one embodiment of the lubricant according to any one of items 12)-15) of the present disclosure, the magnetic dendrimer compound is selected from magnetic polyamido-amine compounds as shown in formula (III):

$$\Gamma(CH_2)_3N_{(2^{n+1}-1)}[(CH_2)_2CONH(CH_2)_2NH]_{(2^{n+2}-2)}$$
$$(C_mH_{2m+1})_2^{n+1} \quad (III),$$

wherein $\Gamma$ indicates a magnetic particle coated with $SiO_2$ on a surface thereof, the magnetic particle having been modified by a silane coupling agent, wherein $(CH_2)_3N_{(2^{n+1}-1)}R^1_{(2^{n+2}-2)}$ is a dendritic group, and wherein $(C_mH_{2m+1})_2^{n+1}$ is a lipophilic group, with $0 \le n \le 10$, and $1 \le m \le 18$.

17) In one embodiment of the lubricant according to item 16) of the present disclosure, in the magnetic polyamido-amine compounds, "n" is an integer selected from 5-9, and "m" is an integer selected from 9-13.

In the lubricant of the present disclosure, the magnetic polyamidoamine compound is preferably at least one selected from a group consisting of fifth generation magnetic dendrimer compounds (G5, n=5, m=12), sixth generation magnetic dendrimer compounds (G6, n=6, m=12), seventh generation magnetic dendrimer compounds (G7, n=7, m=12), eighth generation magnetic dendrimer compounds (G8, n=8, m=12), ninth generation magnetic dendrimer compounds (G9, n=9, m=12), and tenth generation magnetic dendrimer compounds (G10, n=10, m=12).

The magnetic dendrimer compounds of the present disclosure have the following advantages.

1) Targeting Effects

Magnetism of the magnetic dendrimer compound will not be weakened by addition of a dendrimer compound. A vibrating sample magnetometer (VSM) is used to perform magnetic hysteresis loop analysis on the $Fe_3O_4$ magnetic nanoparticles and the $Fe_3O_4$ magnetic nanoscale dendrimer compound, whereby no significant reduction in saturation magnetization of the two has been discerned. As can be seen, the magnetic dendrimer compound as prepared has relatively strong magnetism. An oil product comprising the magnetic dendrimer compound of the present disclosure can reach a wear portion accurately and rapidly, and form a protection oil film on the surface of a friction pair. Therefore, the magnetic dendrimer compound has wear targeting effects.

2) Nano Repairing Effects

The core-shell $Fe_3O_4\&SiO_2$ magnetic nanoparticles are surface modified to prepare the magnetic dendrimer compound. Since the core (i.e., $Fe_3O_4\&SiO_2$) and the surface modifier (i.e., the dendrimer compound) are both nano sized (1-100 nm), the magnetic particle dendrimer compound prepared should be nanosized also. A transmission electron-microscope is used to perform particle size analysis on the fifth generation magnetic dendrimer compound. The particle size of the nanoscale dendrimer compound is preferably about 30 nm. An oil product comprising the nanodendrimer compound of the present disclosure has repairing effects on the surface of a worn friction pair.

3) Fine Oil Solubility

The magnetic dendrimer compound of the present disclosure has fine solubility in a base oil, and can be dissolved in base oils or synthetic oils I, II, III, and IV. This is because the dendrimer compound of the present disclosure has a lipophilic group such as a long-chain alkyl group in an end thereof.

4) Excellent Anti-Wear Performance and Superior Extreme Pressure Performance

The magnetic dendrimer compound of the present disclosure, as an anti-wear additive, can be added into a lubricant, such as an engine lubricant, to exhibit superior anti-wear performance. For example, the fifth generation magnetic polyamidoamine compound can be dissolved into a base oil of 100 N, and the resulting mixture is tested with an SRV multi-functional friction-wear tester for anti-wear performance thereof. As the load increases, the friction coefficient slightly decreases and becomes stable around 0.119. This is because an oil film on a surface of the friction pair is formed gradually and becomes stable. As can be indicated, the fifth generation magnetic polyamidoamine compound has excellent anti-wear performance. In addition to formation of an oil film on the surface of an object, because the magnetic dendrimer compound is in the form of nanoscale particles, it can also be filled into pits or scratches in a surface of the object. The pits and scratches can thus be filled up, thereby repairing the surface of the object. Meanwhile, a lubricant comprising the magnetic dendrimer compound of the present disclosure also have effects of cooling the surface of the object and sealing, as well as superior extreme pressure performance.

5) Greenness and Environmental Friendliness

The magnetic dendrimer compound of the present disclosure obviously does not contain harmful element of S, P, Cl, Pb, or the like, and therefore will not cause any damage to the environment when being added in any lubricants as an additive, such as an anti-wear additive.

DETAILED DESCRIPTION OF THE EMBODIMENTS

The present disclosure will be explained in detail with reference to the examples and accompany drawings. However, the scope of the present disclosure is not limited to the following examples.

Figure 1:
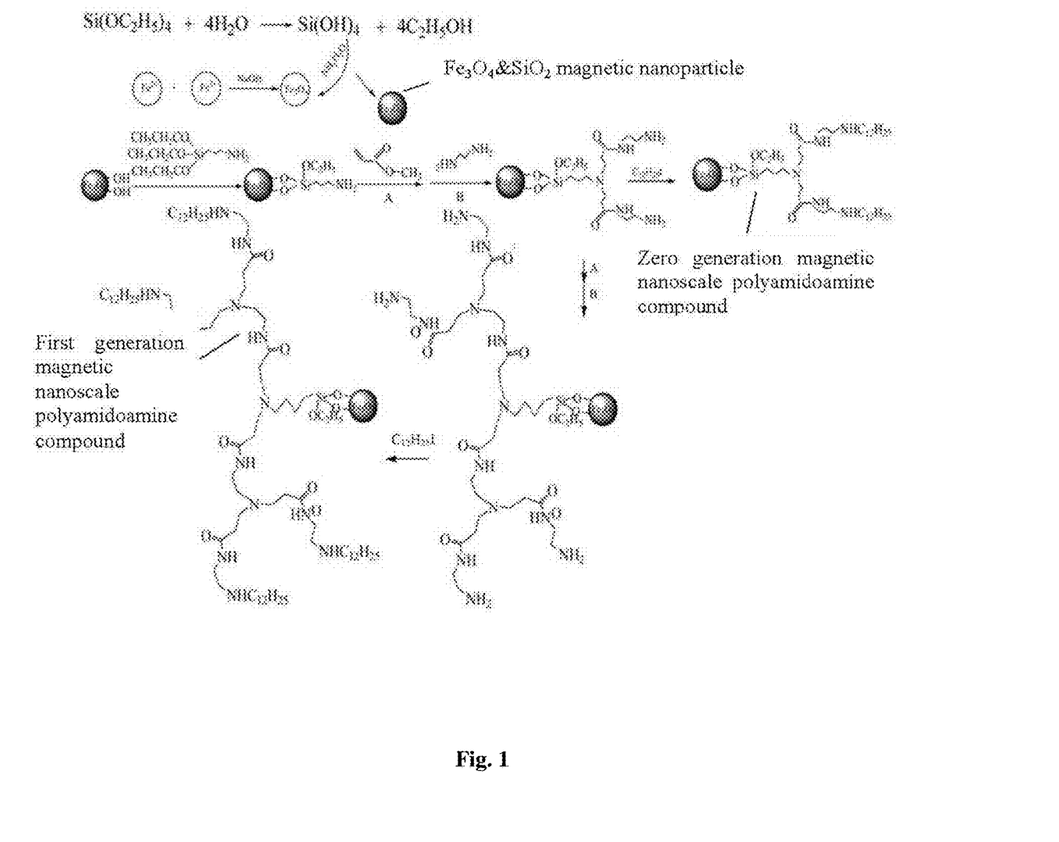
FIG. 1 shows a reaction process between a dendrimer compound of nanoscale magnetic particle with $Fe_3O_4\&SiO_2$ as its core, and a nanoscale polyamidoamine dendrimer compound (G0, G1, m=12) according to the present disclosure.
Figure 2:
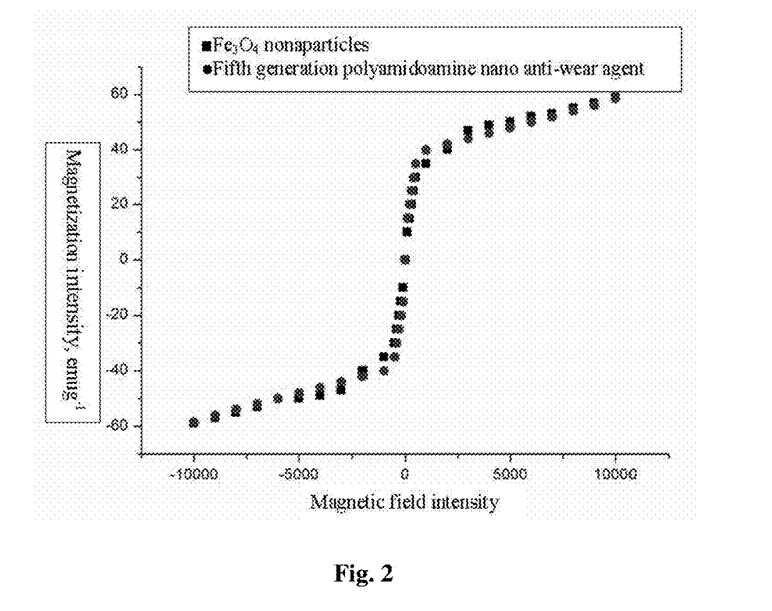
FIG. 2 shows magnetic hysteresis loops of $Fe_3O_4$ nanoparticles and a $Fe_3O_4$ magnetic particle nanoscale polyamidoamine compound (G5, m=12) according to the present disclosure.

In the present disclosure, a vibrating sample magnetometer (VSM) was used to perform magnetic hysteresis loop analysis on $Fe_3O_4$ nanoparticles and a magnetic polyamidoamine compound (G5, m=12). FIG. 2 shows specific saturation magnetization of a fifth generation magnetic polyamidoamine compound was 58.5 emu/g, which was not significantly reduced as compared with that of pure $Fe_3O_4$ nanoparticles. As can be seen, the magnetic polyamidoamine compound as prepared had relatively strong magnetism.

Figure 3:
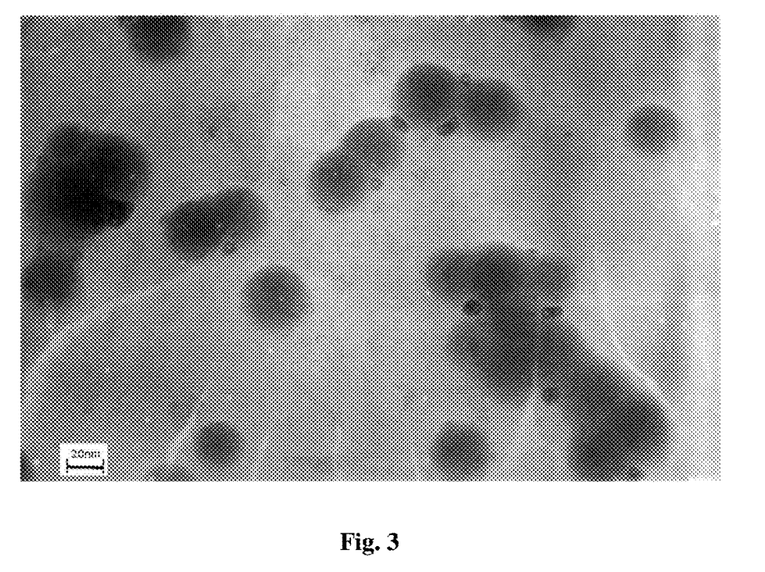
FIG. 3 shows a transmission electron microscope image of a fifth generation magnetic polyamidoamine compound (m=12) of the present disclosure.

A transmission electronmicroscope was used to perform particle size analysis on the fifth generation magnetic polyamidoamine compound. FIG. 3 indicates that the particle size of the fifth generation magnetic polyamidoamine compound was about 30 nm.

An SRV multi-functional friction-wear tester was used to test a lubricant comprising the nanoscale polyamidoamine compound of the present disclosure. The pattern of a friction pair pattern comprising a ball and a disk was used. The test was performed under a frequency of 50 Hz, a temperature of 50° C., and gradiently increasing pressures from 50 N in the beginning, 100 N in two minutes, so on and so forth, to 2,000 N in the end (or till the friction coefficient reaches 0.3).

In the present disclosure, the contents of Fe and/or Ni as well as Si in the lubricant were tested in accordance with the method as prescribed in the standards of ASTM D5185.

Distribution coefficient was an attached parameter determined in gel chromatography. The closer the parameter to 1 is, the more homogeneous the molecular distribution is.

EXAMPLE 1

Preparation of a magnetic polyamidoamine compound (n=0, m=12) with $Fe_3O_4\&SiO_2$ as its core.

(1) A 0.1 mol/L $FeCl_2.4H_2O$ solution and a 0.2 mol/L $FeCl_3.6H_2O$ solution with a volume ratio of 2:1 therebetween were added into a first container, which was placed into an ultrasonic reactor at (30±1)° C. A 0.1 mol/L NaOH solution was added dropwise under ultrasound, until the resulting solution had a pH value of 12. Magnetic field was used to separate magnetic particles. Deionized water was used to wash the magnetic particles until a washing liquid had a pH value of 7. Black $Fe_3O_4$ nanoparticles could thus be obtained.

(2) 18.4 g of $Fe_3O_4$ nanoparticles were weighed and dispersed into 100 mL of anhydrous ethanol, into which a few drops of oleic acid were added, followed by 10 minutes of ultrasonic dispersion. The dispersed solution was transferred to a second container, into which 20.8 g of tetraethoxysilane (TEOS) and 7 g of $NH_3.H_2O$ were added, followed by 3 hours of stirring. After reactions were completed, the resulting solution was repeatedly washed with distilled water under magnetic attraction, until the solution would not turn morbid any more. A resulting precipitate was dried under vacuum at 80° C., and then porphyrized, to give the final core-shell magnetic nanoparticles of $Fe_3O_4\&SiO_2$.

(3) 5 g of the core-shell magnetic nanoparticles of $Fe_3O_4\&SiO_2$ were weighed and placed into a flask, in which 20 mL of a toluene solution of a silane coupling agent (KH550, 3-aminopropyl triethoxysilane) at a concentrate of 10% by volume was added dropwise. Reaction was performed for 60 min at 50° C. After the temperature was lowered down to room temperature, the resulting mixture was filtered under vacuum, washed with methanol, and then dried for 12 h in a vacuum drying oven at 70° C.

(4) 5 g of product obtained after silanization (surface modification) was placed into a flask, into which 20 mL of a methanol solution of methyl acrylate at a concentration of 30% by volume was slowly added, followed by stirring for 90 min at 60° C. After the temperature was lowered down to room temperature, the resulting mixture was filtered under vacuum, washed with methanol and then dried. 5.8 g of the resulting product was placed into a flask, into which 20 mL of a methanol solution of ethylenediamine at a concentration of 30% by volume was added. Stirring followed for 180 min at 60° C. After the temperature was lowered down to room temperature, the resulting mixture was filtered under vacuum, washed with methanol and then dried, to give magnetic nanoparticles modified by PAMAM dendrimer generation zero.

(5) 1.8 g of the obtained PAMAM dendrimer generation zero was added into 0.5 g of $C_{12}H_{25}I$, followed by stirring for 10 min at room temperature. A sample was placed into a microwave extraction tank, in which reaction was performed for 30 min at a microwave power of 200 W and a temperature of 50° C. After the temperature was lowered down to room temperature, suction filtration was performed under reduced pressure, followed by washing with methanol and drying, to obtain 2.1 g of magnetic polyamidoamine compound G0, i.e., PAMAM magnetic nano anti-wear agent (G0, n=0, m=12).

Test and analysis showed the molecular formula of the PAMAM magnetic nano anti-wear agent G0 is $(Fe_3O_4\&SiO_2)Si(OCH_3)_3(CH_2)_3N[(CH_2)_2CONH(CH_2)_2NH]_2(C_{12}H_{25})_2$, the molecular weight of which is 989.

$^{13}CNMR$, δ (ppm), 170-180 (d, C=O), 52-60 (quint, C—Si), 45-51 (d, $CH_3$), 31-40 (d, C—N), 10-20 (quart, $CH_2$). FTIR(KBr)ν ($cm^{-1}$), 2980 ($v_{CH3}$), 2940, 2870, 1467 ($v_{CH2}$), 1644 ($v_{C=O}$), 1560 ($v_{N—H}$), 1350($v_{C—N}$), 1275 ($v_{si-C}$), 1116 ($v_{↓}$), 1080($v_{si-O}$), 1401.8 ($v_{si-O—Fe}$), 579 ($v_{Fe—O-si}$).

The first to ten generation magnetic nanoparticles (m=12) of $Fe_3O_4\&SiO_2$ coated with silica gel and modified by PAMAM dendrimers, and the first to tenth generation magnetic polyamidoamine compounds (G1-10, n=1-10, m=12) were obtained successively by means of repetition of steps (4) and (5).

Gel permeation chromatography was used to analyze the first to tenth generation PAMAM magnetic nano anti-wear agents. The first generation PAMAM magnetic nano anti-wear agent (m=12) has a molecular formula of $(Fe_3O_4\&SiO_2)Si(OCH_3)_3(CH_2)_3N_3[(CH_2)_2CONH(CH_2)_2NH]_6(C_{12}H_{25})_4$, of which the number-average molar mass was actually tested to be 1721, and the distribution coefficient was 1.05.

The second generation magnetic nanoscale polyamidoamine compound (m=12) has a molecular formula of $(Fe_3O_4\&SiO_2)Si(OCH_3)_3(CH_2)_3N_7[(CH_2)_2CONH(CH_2)_2NH]_{14}(C_{12}H_{25})_8$, of which the number-average molar mass was actually tested to be 3332, and the distribution coefficient was 1.09.

The third generation magnetic nanoscale polyamidoamine compound (m=12) has a molecular formula of $(Fe_3O_4\&SiO_2)Si(OCH_3)_3(CH_2)_3N_{15}[(CH_2)_2CONH(CH_2)_2NH]_{30}(C12H25)_{16}$, of which the number-average molar mass was actually tested to be 6241, and the distribution coefficient was 1.15.

The fourth generation magnetic nanoscale polyamidoamine compound (m=12) has a molecular formula of $(Fe_3O_4\&SiO_2)Si(OCH_3)_3(CH_2)_3N_{31}[(CH_2)_2CONH(CH_2)_2NH]_{62}(C_{12}H_{25})_{32}$, of which the number-average molar mass was actually tested to be 13051, and the distribution coefficient was 1.18.

The fifth generation magnetic nanoscale polyamidoamine compound (m=12) has a molecular formula of $(Fe_3O_4\&SiO_2)Si(OCH_3)_3(CH_2)_3N_{63}[(CH_2)_2CONH(CH_2)_2NH]_{126}(C_{12}H_{25})_{64}$, of which the number-average molar mass was actually tested to be 24752, and the distribution coefficient was 1.23.

The sixth generation magnetic polyamidoamine compound (m=12) has a molecular formula of $(Fe_3O_4\&SiO_2)Si(OCH_3)_3(CH_2)_3N_{127}[(CH_2)_2CONH(CH_2)_2NH]_{254}(C_{12}H_{25})_{128}$, of which the number-average molar mass was actually tested to be 46012, and the distribution coefficient was 1.29.

The seventh generation magnetic polyamidoamine compound (m=12) has a molecular formula of $(Fe_3O_4\&SiO_2)Si(OCH_3)_3(CH_2)_3N_{255}[(CH_2)_2CONH(CH_2)_2NH]_{510}(C_{12}H_{25})_{256}$, of which the number-average molar mass was actually tested to be 93245, and the distribution coefficient was 1.34.

The eighth generation magnetic polyamidoamine compound (m=12) has a molecular formula of $(Fe_3O_4\&SiO_2)Si(OCH_3)_3(CH_2)_3N_{511}[(CH_2)_2CONH(CH_2)_2NH]_{1022}(C_{12}H_{25})_{512}$, of which the number-average molar mass was actually tested to be 184059, and the distribution coefficient was 1.38.

The ninth generation magnetic polyamidoamine compound (m=12) has a molecular formula of $(Fe_3O_4\&SiO_2)Si(OCH_3)_3(CH_2)_3N_{1023}[(CH_2)_2CONH(CH_2)_2NH]_{204}(C_{12}H_{25})_{1024}$, of which the number-average molar mass was actually tested to be 370372, and the distribution coefficient was 1.41.

The tenth generation magnetic polyamidoamine compound (m=12) has a molecular formula of $(Fe_3O_4\&SiO_2)Si(OCH_3)_3(CH_2)_3N_{2047}[(CH_2)_2CONH(CH_2)_2NH]_{409}(C_{12}H_{25})_{2048}$, of which the number-average molar mass was actually tested to be 728913, and the distribution coefficient was 1.49.

EXAMPLE 2

Preparation of magnetic polyamidoamine compound (m=18) (PAMAM) G0 with $Ni\&SiO_2$ as its core.

(1) 10 g of Ni nanoparticles were weighed and dispersed into 100 mL of anhydrous ethyl alcohol, into which oleic acid was added, followed by 10 minutes of ultrasonic dispersion. The dispersed solution was transferred to a 250 mL first container, into which 15 g of TEOS and 5 g of $NH_3.H_2O$ were added, followed by 3 hours of stirring. After reactions were completed, the resulting solution was repeatedly washed with distilled water under magnetic attraction, until the solution would not turn morbid any more. A resulting precipitate was dried under vacuum at 80° C., and finally porphyrized to give the final core-shell magnetic nanoparticles of $Ni\&SiO_2$.

(2) 5 g of the core-shell magnetic nanoparticles of $Ni\&SiO_2$ were weighed and placed into a flask, into which 20 mL of a toluene solution of a silane coupling agent (KH550, 3-aminopropyl triethoxysilane) at a concentrate of 10% by volume was added dropwise. Reaction followed for 60 min at 50° C. After the temperature was lowered down to room temperature, the resulting mixture was filtered under vacuum, washed with methanol, and then dried for 12 h in a vacuum drying oven at 70° C.

(3) 5 g of product obtained after silanization, was placed into a second container, into which 20 mL of a methanol solution of methyl acrylate at a concentration of 30% by volume was slowly added, followed by stirring for 90 min at 60° C. After the temperature was lowered down to room temperature, the resulting mixture was filtered under vacuum, washed with methanol and then dried. 5.8 g of the resulting product was weighed and placed into a flask, into which 20 mL of a methanol solution of ethylenediamine at a concentration of 30% by volume was added. Stirring followed for 180 min at 60° C. After the temperature was lowered down to room temperature, the resulting mixture was filtered under vacuum, washed with methanol and then dried, to give magnetic nanoparticles modified by PAMAM dendrimer G0.

(4) 1.8 g of the obtained PAMAM dendrimer G0 was added into 0.5 g of $C_{12}H_{25}I$, followed by stirring for 10 min at room temperature. A sample was placed into a microwave extraction tank, in which reaction was performed for 30 min at a microwave power of 200 W and a temperature of 50° C. After the temperature was lowered down to room temperature, the resulting mixture was filtered under vacuum, washed with methanol and then dried, to obtain 2.1 g of magnetic polyamidoamine compound G0, i.e., PAMAM magnetic nano anti-wear agent with Ni&$SiO_2$ as its core (G0, n=0, m=18).

Test and analysis showed the molecular formula of the PAMAM magnetic nano anti-wear agent G0 is (Ni&$SiO_2$)Si$(OCH_3)_3(CH_2)_3N$ $[(CH_2)_2CONH(CH_2)_2NH]_2(C_{18}H_{37})_2$, the molecular weight of which is 989.

$^{13}CNMR$, δ (ppm), 170-180 (d, C=O), 52-60 (quint, C—Si), 45-51 (d, $CH_3$), 31-40 (d, C—N), 10-20 (quart, $CH_2$). FTIR(KBr) ν ($cm^{-1}$), 2980 ($v_{CH3}$), 2940, 2870, 1467 ($v_{CH2}$), 1644 ($v_{C=O}$), 1560 ($v_{N—H}$), 1350($v_{C—N}$), 1275 ($v_{si-C}$), 1116 (υ-⊥-), 1080 ($v_{si-O}$) 403($v_{Ni—O}$).

The first to tenth generation magnetic polyamidoamine compounds (G1-10, n=1-10, m=12) were obtained successively by means of repetition of steps (3) and (4).

Gel permeation chromatography was used to analyze the first to tenth generation PAMAM magnetic nano anti-wear agents. The first generation PAMAM magnetic nano anti-wear agent (m=18) has a molecular formula of (Fe$_3$O$_4$&SiO$_2$)Si(OCH$_3$)$_3$(CH$_2$)$_3$N$_3$[(CH$_2$)$_2$CONH(CH$_2$)$_2$NH]$_6$(C$_{18}$H$_{37}$)$_4$, of which the number-average molar mass was actually tested to be 1883, and the distribution coefficient was 1.02.

The second generation magnetic polyamidoamine compound (m=18) has a molecular formula of (Ni&SiO$_2$)Si(OCH$_3$)$_3$(CH$_2$)$_3$N$_7$[(CH$_2$)$_2$CONH(CH$_2$)$_2$NH]$_{14}$(C$_{18}$H$_{37}$)$_8$, of which the number-average molar mass was actually tested to be 3830, and the distribution coefficient was 1.05.

The third generation magnetic polyamidoamine compound (m=18) has a molecular formula of (Ni&SiO$_2$)Si(OCH$_3$)$_3$(CH$_2$)$_3$N$_{15}$[(CH$_2$)$_2$CONH(CH$_2$)$_2$NH]$_{30}$(C$_{18}$H$_{37}$)$_{16}$, of which the number-average molar mass was actually tested to be 7411, and the distribution coefficient was 1.09.

The fourth generation magnetic polyamidoamine compound (m=18) has a molecular formula of (Ni&SiO$_2$)Si(OCH$_3$)$_3$(CH$_2$)$_3$N$_{31}$[(CH$_2$)$_2$CONH(CH$_2$)$_2$NH]$_{62}$(C$_{18}$H$_{37}$)$_{32}$, of which the number-average molar mass was actually tested to be 15565, and the distribution coefficient was 1.15.

The fifth generation magnetic polyamidoamine compound (m=18) has a molecular formula of (Ni&SiO$_2$)Si(OCH$_3$)$_3$(CH$_2$)$_3$N$_{63}$[(CH$_2$)$_2$CONH(CH$_2$)$_2$NH]$_{126}$(C$_{18}$H$_{37}$)$_{64}$, of which the number-average molar mass was actually tested to be 27266, and the distribution coefficient was 1.19.

The sixth generation magnetic polyamidoamine compound (m=18) has a molecular formula of (Ni&SiO$_2$)Si(OCH$_3$)$_3$(CH$_2$)$_3$N$_{127}$[(CH$_2$)$_2$CONH(CH$_2$)$_2$NH]$_{254}$(C$_{18}$H$_{37}$)$_{128}$, of which the number-average molar mass was actually tested to be 56590, and the distribution coefficient was 1.22.

The seventh generation magnetic polyamidoamine compound (m=18) has a molecular formula of (Ni&SiO$_2$)Si(OCH$_3$)$_3$(CH$_2$)$_3$N$_{255}$[(CH$_2$)$_2$CONH(CH$_2$)$_2$NH]$_{510}$(C$_{18}$H$_{37}$)$_{256}$, of which the number-average molar mass was actually tested to be 114575, and the distribution coefficient was 1.29.

The eighth generation magnetic polyamidoamine compound (m=18) has a molecular formula of (Ni&SiO$_2$)Si(OCH$_3$)$_3$(CH$_2$)$_3$N$_{511}$[(CH$_2$)$_2$CONH(CH$_2$)$_2$NM]$_{1022}$(C$_{18}$H$_{37}$)$_{512}$, of which the number-average molar mass was actually tested to be 226895, and the distribution coefficient was 1.33.

The ninth generation magnetic polyamidoamine compound (m=18) has a molecular formula of (Ni&SiO$_2$)Si(OCH$_3$)$_3$(CH$_2$)$_3$N$_{1023}$[(CH$_2$)$_2$CONH(CH$_2$)$_2$NH]$_{2046}$(C$_{18}$H$_{37}$)$_{1024}$, of which the number-average molar mass was actually tested to be 456214, and the distribution coefficient was 1.39.

The tenth generation magnetic polyamidoamine compound (m=18) has a molecular formula of (Ni&SiO$_2$)Si(OCH$_3$)$_3$(CH$_2$)$_3$N$_{2047}$[(CH$_2$)$_2$CONH(CH$_2$)$_2$NH]$_{4094}$(C$_{18}$H$_{37}$)$_{2048}$, of which the number-average molar mass was actually tested to be 900771, and the distribution coefficient was 1.45.

EXAMPLE 3

A fourth generation magnetic polyamidoamine compound (n=4, m=15) with Fe$_3$O$_4$&SiO$_2$ as its core was used in a gasoline engine lubricating oil as a magnetic nano anti-wear agent. According to the formula as shown in Table 1, the fourth generation magnetic polyamidoamine compound (n=4, m=15) as a fourth generation magnetic nano anti-wear agent A (2.58 ppm of Fe and 0.05 ppm of Si), an organic molybdenum anti-wear agent (e.g., molybdenum dialkyldithiophosphate) that was commonly available in the market, were respectively used to formulate gasoline engine lubricating oil SM 5W-30.

TABLE 1

| Gasoline engine lubricating oil SM 5W-30 | | | | | |
|---|---|---|---|---|---|
| Base oil 100N | Base oil 150N | Base oil PAO-4 | Functional additive A* | Fourth generation magnetic nano anti-wear agent A | Anti-wear agent (molybdenum dialkyldithiophosphate) |
| 3-1 wt % | 35 | 45 | 5 | 15 | 200 ppm | — |
| 3-2 wt % | 35 | 45 | 5 | 15 | — | 200 ppm |

Note:
A* contains an anti-wear additive, which represents zinc dialkyldithiophosphate(ZnDDP).

The analysis results of gasoline engine lubricating oil SM 5W-30 are shown as follows.

TABLE 2

Analysis results of gasoline engine lubricating oil SM 5W-30

| Analysis item | 3-1 | 3-2 | Test method |
|---|---|---|---|
| Dynamic viscosity (100° C.), mm$^2$/s | 9.98 | 10.02 | GB/T 265 |
| Low temperature (−30° C.) dynamic viscosity, mPa · s | 5,900 | 5,890 | GB/T 6538 |
| Low temperature (−35° C.) pumping viscosity in the case of no yield stress, mPa · s | 26,000 | 26,010 | SH/T 0562 |
| Moisture (volume), % | Trace | Trace | GB/T 260 |
| Flash point (opening), ° C. | 220 | 220 | GB/T 3536 |
| High temperature high shear viscosity (150° C., 106 s−1), mPa · s | 3.55 | 3.54 | SH/T 0703 |
| Dynamic viscosity at 100° C. after shearing in a shear test of diesel nozzle, mm$^2$/s | 9.52 | 9.54 | SH/T 0103 |
| Friction coefficient | 0.07 | 0.11 | M* |

Note:
M* pattern of friction pair: ball and disk; test conditions: 50 Hz, 200 g, and 80° C.

The analysis data in Table 2 show that the friction coefficient of the oil product SM 5W-30 formulated with the fourth generation magnetic nano anti-wear agent A of the present disclosure is 0.07, while the friction coefficient of the oil product SM 5W-30 formulated with molybdenum dialkyldithiophosphate as the anti-wear agent is 0.11. As can be seen, the fourth generation magnetic polyamidoamine compound (n=4, m=15) is a rather excellent magnetic nano anti-wear agent.

EXAMPLE 4

A fourth generation magnetic polyamidoamine compound (n=4, m=18) which has γ-Fe$_2$O$_3$&SiO$_2$ as its core was used in a diesel engine lubricating oil as a magnetic nano anti-wear agent.

According to the formula as shown in Table 3, diesel engine lubricating oil CJ-4 5W-40 was formulated with the fourth generation magnetic polyamidoamine compound (n=4, m=18) as a fourth generation magnetic nano anti-wear agent B (429 ppm of Fe and 9.1 ppm of Si).

TABLE 3

Formula for diesel engine lubricating oil CJ-4 5W-40

| | Base oil 100 N | Base oil 150 N | Base oil PAO-4 | Functional additive B* | Fourth generation magnetic nano anti-wear agent B |
|---|---|---|---|---|---|
| 4-1 wt % | 10 | 57 | 20 | 13 | — |
| 4-2 wt % | 10 | 52 | 20 | 13 | 5 |

Note:
B* contains no anti-wear additive therein.

The analysis results of diesel engine lubricating oil CJ 5W-40 are shown as follows.

TABLE 4

Analysis results of diesel engine lubricating oil CJ 5W-40

| Analysis item | 4-1 | 4-2 | Test method |
|---|---|---|---|
| Dynamic viscosity (100° C.), mm$^2$/s | 14.85 | 14.86 | GB/T 265 |

TABLE 4-continued

Analysis results of diesel engine lubricating oil CJ 5W-40

| Analysis item | 4-1 | 4-2 | Test method |
|---|---|---|---|
| Low temperature (−30° C.) dynamic viscosity, mPa · s | 5,900 | 5,910 | GB/T 6538 |
| Low temperature (−35° C.) pumping viscosity in case of no yield stress, mPa · s | 29,010 | 29,030 | SH/T 0562 |
| Flash point (opening), ° C. | 230 | 230 | GB/T 3536 |
| High temperature high shear viscosity (150° C., 10$^6$ s$^{-1}$), mPa · s | 3.97 | 3.95 | SH/T 0703 |
| Dynamic viscosity at 100° C. after shearing in a shear test of diesel nozzle, mm$^2$/s | 14.16 | 14.15 | SH/T 0103 |
| Base number (based on KOH), mg/g | 10.02 | 10.05 | SH/T 0251 |
| Friction coefficient | 1.98 | 0.09 | M* |

Note:
M* pattern of friction pair: ball and disk; test conditions: 50 Hz, 200 g, and 80° C.

The above table indicates an instable curve of friction coefficient when an SRV was used to test anti-wear performance of formulation I. However, after the fourth generation magnetic nano anti-wear agent B of the present example was added, the friction coefficient of the diesel engine lubricating oil CJ-4 5W-40 became stable to be only 0.09. As can be concluded, the fourth generation magnetic polyamidoamine compound (n=4, m=18) has superior anti-wear performance, and is therefore a rather excellent anti-wear additive.

EXAMPLE 5

A fourth generation magnetic polyamidoamine compound (n=4, m=18) which has γ-Fe$_3$O$_4$&SiO$_2$ as its core was used in a diesel engine lubricating oil as a magnetic nano anti-wear agent.

According to the formula as shown in Table 5, diesel engine lubricating oil CJ-4 5W-40 was formulated with the fourth generation magnetic polyamidoamine compound (n=4, m=18) as a fourth generation magnetic nano anti-wear agent C (259 ppm of Fe and 5.41 ppm of Si).

TABLE 5

Formula for diesel engine lubricating oil CJ-4 5W-40

| | Base oil 100 N | Base oil 150 N | Base oil PAO-4 | Functional additive C* | Magnetic nano anti-wear agent C |
|---|---|---|---|---|---|
| 5-1 wt % | 10 | 57 | 20 | 13 | — |
| 5-2 wt % | 10 | 55 | 20 | 13 | 2 |

Note:
C* contains no anti-wear additive therein.

The analysis results of diesel engine lubricating oil CJ-4 5W-40 are shown as follows.

TABLE 6

Analysis results of diesel engine lubricating oil CJ-4 5W-40

| Analysis item | 5-1 | 5-2 | Test method |
|---|---|---|---|
| Dynamic viscosity (100° C.), mm$^2$/s | 14.85 | 14.86 | GB/T 265 |
| Low temperature (−30° C.) dynamic viscosity, mPa · s | 5,900 | 5,910 | GB/T 6538 |

TABLE 6-continued

Analysis results of diesel engine lubricating oil CJ-4 5W-40

| Analysis item | 5-1 | 5-2 | Test method |
|---|---|---|---|
| Low temperature (−35° C.) pumping viscosity in the case of no yield stress, mPa · s | 29,010 | 29,030 | SH/T 0562 |
| Flash point (opening), ° C. | 230 | 230 | GB/T 3536 |
| High temperature high shear viscosity (150° C., $10^6$ $s^{-1}$), mPa · s | 3.97 | 3.95 | SH/T 0703 |
| Dynamic viscosity at 100° C. after shearing in a shear test of diesel nozzle, $mm^2/s$ | 14.16 | 14.15 | SH/T 0103 |
| Base number (based on KOH), mg/g | 10.02 | 10.05 | SH/T 0251 |
| Friction coefficient | 1.98 | 0.09 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the fourth generation magnetic nano anti-wear agent C of the present example was added, the friction coefficient of diesel engine lubricating oil CJ-4 5W-40 became stable to be only 0.09. As can be concluded, the fourth generation magnetic polyamidoamine compound (n=4, m=18) has superior anti-wear performance, and is therefore a rather excellent anti-wear additive.

EXAMPLE 6

A fifth generation magnetic polyamidoamine compound (n=5, m=12) which has Ni&$SiO_2$ as its core was used in a diesel engine lubricating oil as a magnetic nano anti-wear agent.

According to the formula as shown in Table 7, diesel engine lubricating oil CF-4 5W-30 was formulated with the fifth generation magnetic polyamidoamine compound (n=5, m=12) as a magnetic nano anti-wear agent D (108 ppm of Ni and 20.1 ppm of Si).

TABLE 7

Formula for diesel engine lubricating oil CF-4 5W-30

| | Base oil 100 N | Base oil 150 N | Base oil PAO-4 | Functional additive D* | Magnetic nano anti-wear agent D |
|---|---|---|---|---|---|
| 6-1 wt % | 17 | 40 | 30 | 13 | — |
| 6-2 wt % | 17 | 40 | 25 | 13 | 5 |

Note:
D* contains no anti-wear additive therein.

The analysis results of diesel engine lubricating oil CF-4 5W-30 are shown as follows.

TABLE 8

Analysis results of diesel engine lubricating oil CF-4 5W-30

| Analysis item | 6-1 | 6-2 | Test method |
|---|---|---|---|
| Dynamic viscosity (100° C.), $mm^2/s$ | 9.88 | 9.86 | GB/T 265 |
| Low temperature (−30° C.) dynamic viscosity, mPa · s | 5,205 | 5,200 | GB/T 6538 |
| Low temperature (−35° C.) pumping viscosity in the case of no yield stress, mPa · s | 21,010 | 21,200 | SH/T 0562 |
| Flash point (opening), ° C. | 230 | 230 | GB/T 3536 |
| High temperature high shear viscosity (150° C., $10^6$ $s^{-1}$), mPa · s | 3.65 | 3.63 | SH/T 0703 |
| Dynamic viscosity at 100° C. after shearing in a shear test of diesel nozzle, $mm^2/s$ | 9.65 | 9.64 | SH/T 0103 |
| Base number (based on KOH), mg/g | 10.25 | 10.23 | SH/T 0251 |
| Friction coefficient | 1.85 | 0.08 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the fifth generation magnetic nano anti-wear agent D of the present example was added, the friction coefficient of diesel engine lubricating oil CF-4 5W-30 became stable to be only 0.08. As can be concluded, the fifth generation magnetic polyamidoamine compound (n=5, m=12) has superior anti-wear performance, and is therefore a rather excellent anti-wear additive.

EXAMPLE 7

A fifth generation magnetic polyamidoamine compound (n=5, m=5) which has $Fe_3O_4$&$SiO_2$ as its core was used in a diesel engine lubricating oil as a magnetic nano anti-wear agent.

According to the formula as shown in Table 9, diesel engine lubricating oil CF-4 5W-30 was formulated with the fifth generation magnetic polyamidoamine compound (n=5, m=5) as a magnetic nano anti-wear agent E (68 ppm of Fe and 1.45 ppm of Si).

TABLE 9

Formula for diesel engine lubricating oil CF-4 5W-30

| | Base oil 100N | Base oil 150N | Base oil PAO-4 | Functional additive E* | Magnetic nano anti-wear agent E |
|---|---|---|---|---|---|
| 7-1 wt % | 17 | 40 | 30 | 13 | — |
| 7-2 wt % | 17 | 40 | 29 | 13 | 1 |

Note:
E* contains no anti-wear additive therein.

The analysis results of diesel engine lubricating oil CF-4 5W-30 are shown as follows.

TABLE 10

Analysis results of diesel engine lubricating oil CF-4 5W-30

| Analysis item | 7-1 | 7-2 | Test method |
|---|---|---|---|
| Dynamic viscosity (100° C.), $mm^2/s$ | 9.88 | 9.86 | GB/T 265 |
| Low temperature (−30° C.) dynamic viscosity, mPa · s | 5,205 | 5,200 | GB/T 6538 |
| Low temperature (−35° C.) pumping viscosity in the case of no yield stress, mPa · s | 21,010 | 21,200 | SH/T 0562 |
| Flash point (opening), ° C. | 230 | 230 | GB/T 3536 |
| High temperature high shear viscosity (150° C., $10^6$ $s^{-1}$), mPa · s | 3.65 | 3.63 | SH/T 0703 |

TABLE 10-continued

Analysis results of diesel engine lubricating oil CF-4 5W-30

| Analysis item | 7-1 | 7-2 | Test method |
|---|---|---|---|
| Dynamic viscosity at 100° C. after shearing in a shear test of diesel nozzle, mm$^2$/s | 9.65 | 9.64 | SH/T 0103 |
| Base number (based on KOH), mg/g | 10.25 | 10.23 | SH/T 0251 |
| Friction coefficient | 1.87 | 0.08 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the fifth generation magnetic nano anti-wear agent E of the present example was added, the friction coefficient of diesel engine lubricating oil CF-4 5W-30 became stable to be only 0.08. As can be concluded, the fifth generation magnetic polyamidoamine compound (n=5, m=5) has superior anti-wear performance, and is therefore a rather excellent anti-wear additive.

EXAMPLE 8

A sixth generation magnetic polyamidoamine compound (n=5, m=12) which has $Fe_3O_4\&SiO_2$ as its core was used in a diesel engine lubricating oil as a magnetic nano anti-wear agent.

According to the formula as shown in Table 9, diesel engine lubricating oil CF-4 5W-30 was formulated with the sixth generation magnetic polyamidoamine compound (n=6, m=12) as a magnetic nano anti-wear agent F (73 ppm of Fe and 1.52 ppm of Si).

TABLE 11

Formula for diesel engine lubricating oil CF-4 5W-30

| | Base oil 100 N | Base oil 150 N | Base oil PAO-4 | Functional additive F* | Magnetic nano anti-wear agent F |
|---|---|---|---|---|---|
| 8-1 wt % | 17 | 40 | 30 | 13 | — |
| 8-2 wt % | 17 | 40 | 28 | 13 | 2 |

Note:
F* contains no anti-wear additive therein.

The analysis results of diesel engine lubricating oil CF-4 5W-30 are shown as follows.

TABLE 12

Analysis results of diesel engine lubricating oil CF-4 5W-30

| Analysis item | 8-1 | 8-2 | Test method |
|---|---|---|---|
| Dynamic viscosity (100° C.), mm$^2$/s | 9.88 | 9.86 | GB/T 265 |
| Low temperature (−30° C.) dynamic viscosity, mPa · s | 5,205 | 5,200 | GB/T 6538 |
| Low temperature (−35° C.) pumping viscosity in the case of no yield stress, mPa · s | 21,010 | 21,200 | SH/T 0562 |
| Flash point (opening), ° C. | 230 | 230 | GB/T 3536 |
| High temperature high shear viscosity (150° C., 10$^6$ s$^{-1}$), mPa · s | 3.65 | 3.63 | SH/T 0703 |
| Dynamic viscosity at 100° C. after shearing in a shear test of diesel nozzle, mm$^2$/s | 9.65 | 9.64 | SH/T 0103 |

TABLE 12-continued

Analysis results of diesel engine lubricating oil CF-4 5W-30

| Analysis item | 8-1 | 8-2 | Test method |
|---|---|---|---|
| Base number (based on KOH), mg/g | 10.25 | 10.23 | SH/T 0251 |
| Friction coefficient | 1.92 | 0.07 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the sixth generation magnetic nano anti-wear agent F of the present example was added, the friction coefficient of diesel engine lubricating oil CF-4 5W-30 became stable to be only 0.07. As can be concluded, the sixth generation magnetic polyamidoamine compound (n=6, m=12) has superior anti-wear performance, and is therefore a rather excellent anti-wear additive.

EXAMPLE 9

A sixth generation magnetic polyamidoamine compound (n=6, m=3) which has $\gamma\text{-}Fe_2O_3\&SiO_2$ as its core was used in a diesel engine lubricating oil as a magnetic nano anti-wear agent.

According to the formula as shown in Table 13, diesel engine lubricating oil CF-4 5W-30 was formulated with the sixth generation magnetic polyamidoamine compound (n=6, m=3) as a magnetic nano anti-wear agent H (49 ppm of Fe and 1.08 ppm of Si).

TABLE 13

Formula for diesel engine lubricating oil CF-4 5W-30

| | Base oil 100 N | Base oil 150 N | Base oil PAO-4 | Functional additive M* | Magnetic nano anti-wear agent H |
|---|---|---|---|---|---|
| 9-1 wt % | 17 | 40 | 30 | 13 | — |
| 9-2 wt % | 17 | 40 | 28 | 13 | 2 |

Note:
M* contains no anti-wear additive therein.

The analysis results of diesel engine lubricating oil CF-4 5W-30 are shown as follows.

TABLE 14

Analysis results of diesel engine lubricating oil CF-4 5W-30

| Analysis item | 9-1 | 9-2 | Test method |
|---|---|---|---|
| Dynamic viscosity (100° C.), mm$^2$/s | 9.88 | 9.86 | GB/T 265 |
| Low temperature (−30° C.) dynamic viscosity, mPa · s | 5,205 | 5,200 | GB/T 6538 |
| Low temperature (−35° C.) pumping viscosity in the case of no yield stress, mPa · s | 21,010 | 21,200 | SH/T 0562 |
| Flash point (opening), ° C. | 230 | 230 | GB/T 3536 |
| High temperature high shear viscosity (150° C., 10$^6$ s$^{-1}$), mPa · s | 3.65 | 3.63 | SH/T 0703 |
| Dynamic viscosity at 100° C. after shearing in a shear test of diesel nozzle, mm$^2$/s | 9.65 | 9.64 | SH/T 0103 |

TABLE 14-continued

Analysis results of diesel engine lubricating oil CF-4 5W-30

| Analysis item | 9-1 | 9-2 | Test method |
|---|---|---|---|
| Base number (based on KOH), mg/g | 10.25 | 10.23 | SH/T 0251 |
| Friction coefficient | 1.92 | 0.08 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the sixth generation magnetic nano anti-wear agent H of the present example was added, the friction coefficient of diesel engine lubricating oil CF-4 5W-30 became stable to be only 0.08. As can be concluded, the sixth generation magnetic polyamidoamine compound (n=6, m=3) has superior anti-wear performance, and is therefore a rather excellent anti-wear additive.

EXAMPLE 10

A seventh generation magnetic polyamidoamine compound (n=7, m=1) which has $Fe_2O_3$&$SiO_2$ as its core was used in a diesel engine lubricating oil as a magnetic nano anti-wear agent.

According to the formula as shown in Table 15, diesel engine lubricating oil CF-4 5W-40 was formulated with the seventh generation magnetic polyamidoamine compound (n=7, m=1) as a magnetic nano anti-wear agent J (50 ppm of Fe and 1.0 ppm of Si).

TABLE 15

Formula for diesel engine lubricating oil CF-4 5W-40

| | Base oil 100 N | Base oil 150 N | Base oil PAO-4 | Functional additive N* | Magnetic nano anti-wear agent J |
|---|---|---|---|---|---|
| 10-1 wt % | 20 | 57 | 10 | 13 | — |
| 10-2 wt % | 20 | 53 | 10 | 13 | 4 |

Note:
N* contains no anti-wear additive therein.

The analysis results of diesel engine lubricating oil CF-4 5W-40 are shown as follows.

TABLE 16

Analysis results of diesel engine lubricating oil CF-4 5W-40

| Analysis item | 10-1 | 10-2 | Test method |
|---|---|---|---|
| Dynamic viscosity (100° C.), mm$^2$/s | 14.23 | 14.25 | GB/T 265 |
| Low temperature (−30° C.) dynamic viscosity, mPa · s | 5,705 | 5,700 | GB/T 6538 |
| Low temperature (−35° C.) pumping viscosity in the case of no yield stress, mPa · s | 31,015 | 31,000 | SH/T 0562 |
| Flash point (opening), ° C. | 225 | 225 | GB/T 3536 |
| High temperature high shear viscosity (150° C., 10$^6$ s$^{-1}$), mPa · s | 3.85 | 3.87 | SH/T 0703 |
| Dynamic viscosity at 100° C. after shearing in a shear test of diesel nozzle, mm$^2$/s | 14.02 | 14.00 | SH/T 0103 |

TABLE 16-continued

Analysis results of diesel engine lubricating oil CF-4 5W-40

| Analysis item | 10-1 | 10-2 | Test method |
|---|---|---|---|
| Base number (based on KOH), mg/g | 9.85 | 9.85 | SH/T 0251 |
| Friction coefficient | 1.92 | 0.06 | M* |

Note:
M* pattern of friction pair: ball and disk; test conditions: 50 Hz, 200 g, and 80° C.

The above table indicates an instable curve of friction coefficient when the SRV was used to test anti-wear performance of formulation I. However, after the seventh generation magnetic nano anti-wear agent J of the present example was added, the friction coefficient of diesel engine lubricating oil CF-4 5W-40 became stable to be only 0.06. As can be concluded, the seventh generation magnetic polyamidoamine compound (n=7, m=1) has superior anti-wear performance, and is therefore a rather excellent anti-wear additive.

EXAMPLE 11

A seventh generation magnetic polyamidoamine compound (n=7, m=12) which has $Fe_3O_4$&$SiO_2$ as its core was used in a gasoline engine lubricating oil as a magnetic nano anti-wear agent.

According to the formula as shown in Table 17, gasoline engine lubricating oil SN/GF-5 0W-20 was formulated with the seventh generation magnetic polyamidoamine compound (n=7, m=12) as a magnetic nano anti-wear agent K (28 ppm of Fe and 0.61 ppm of Si), and an organic molybdenum anti-wear agent (e.g., molybdenum dialkyldithiophosphate) that was commonly available in the market, respectively.

TABLE 17

Formula for gasoline engine lubricating oil SN/GF-5 0W-20

| | Base oil 100 N | Base oil 150 N | Base oil PAO-4 | Functional additive P* | Magnetic nano anti-wear agent K | Anti-wear agent (molybdenum dialkyldithio- phosphate) |
|---|---|---|---|---|---|---|
| 11-1 wt % | 55 | 15 | 18 | 10 | 2 | — |
| 11-2 wt % | 55 | 15 | 18 | 10 | — | 2 |

Note:
P* contains an anti-wear additive, which represents zinc dialkyldithiophosphate (ZDDP).

The analysis results of gasoline engine lubricating oil SN/GF-5 0W-20 are shown as follows.

TABLE 18

Analysis results of gasoline engine lubricating oil SN/GF-5 0W-20

| Analysis item | 11-1 | 11-2 | Test method |
|---|---|---|---|
| Dynamic viscosity (100° C.), mm$^2$/s | 8.025 | 8.015 | GB/T 265 |
| Low temperature (−30° C.) dynamic viscosity, mPa · s | 5,700 | 5,695 | GB/T 6538 |
| Low temperature (−35° C.) pumping viscosity in the case of no yield stress, mPa · s | 15,000 | 15,050 | SH/T 0562 |
| Moisture (volume) % | Trace | Trace | GB/T 260 |
| Flash point (opening), ° C. | 228 | 228 | GB/T 3536 |
| High temperature high shear viscosity (150° C., 10$^6$ s$^{-1}$), mPa · s | 3.21 | 3.22 | SH/T 0703 |
| Dynamic viscosity at 100° C. after shearing in a shear test of diesel nozzle, mm$^2$/s | 7.86 | 7.82 | SH/T 0103 |
| Friction coefficient | 0.07 | 0.10 | M* |

Note:
M* pattern of friction pair: ball and disk; test conditions: 50 Hz, 200 g, and 80° C.

The analysis data in Table 18 show that the friction coefficient of the oil product SN/GF-5 0W-20 formulated with the seventh generation magnetic nano anti-wear agent K of the present disclosure is 0.07, while the friction coefficient of the oil product SN/GF-5 0W-20 formulated with molybdenum dialkyldithiophosphate as the anti-wear agent is 0.10. As can be seen, the seventh generation magnetic polyamidoamine compound (n=7, m=12) is a rather excellent magnetic nano anti-wear agent.

EXAMPLE 12

An eighth generation magnetic polyamidoamine compound (n=7, m=8) which has Ni&SiO$_2$ as its core was used in a gasoline engine lubricating oil as a magnetic nano anti-wear agent.

According to the formula as shown in Table 19, gasoline engine lubricating oil SN/GF-5 0W-30 was formulated with the eighth generation magnetic polyamidoamine compound (n=8, m=8) as a magnetic nano anti-wear agent L (0.31 ppm of Ni and 0.06 ppm of Si), and an organic molybdenum salt anti-wear agent (e.g., molybdenum dialkyldithiophosphate) that was commonly available in the market, respectively.

TABLE 19

Formula for gasoline engine lubricating oil SN/GF-5 0W-20

| | Base oil 100N | Base oil 150N | Base oil PAO-4 | Functional additive Q | Magnetic nano anti-wear agent L | Anti-wear agent (molybdenum dialkyldithio-phosphate) |
|---|---|---|---|---|---|---|
| 12-1 wt % | 55 | 17.5 | 15 | 10 | 2.5 | — |
| 12-2 wt % | 55 | 17.5 | 15 | 10 | — | 2.5 |

Note:
Q contains an anti-wear additive, which represents zinc dialkyldithiophosphate (ZDDP).

The analysis results of gasoline engine lubricating oil SN/GF-5 0W-30 are shown as follows.

TABLE 20

Analysis results of gasoline engine lubricating oil SN/GF-5 0W-30

| Analysis item | 12-1 | 12-2 | Test method |
|---|---|---|---|
| Dynamic viscosity (100° C.), mm$^2$/s | 9.82 | 9.83 | GB/T 265 |
| Low temperature (−30° C.) dynamic viscosity, mPa · s | 5,500 | 5,560 | GB/T 6538 |
| Low temperature (−35° C.) pumping viscosity in the case of no yield stress, mPa · s | 17,000 | 17,050 | SH/T 0562 |
| Moisture (volume) % | Trace | Trace | GB/T 260 |
| Flash point (opening), ° C. | 220 | 220 | GB/T 3536 |
| High temperature high shear viscosity (150° C., 10$^6$ s$^{-1}$), mPa · s | 3.18 | 3.19 | SH/T 0703 |
| Dynamic viscosity at 100° C. after shearing in a shear test of diesel nozzle, mm$^2$/s | 9.54 | 9.53 | SH/T 0103 |
| Friction coefficient | 0.08 | 0.11 | M* |

Note:
M* pattern of friction pair: ball and disk; test conditions: 50 Hz, 200 g, and 80° C.

The analysis data in Table 20 show that the friction coefficient of the oil product SN/GF-5 0W-30 formulated with the eighth generation magnetic nano anti-wear agent L of the present disclosure is 0.08, while the friction coefficient of the oil product SN/GF-5 0W-20 formulated with molybdenum dialkyldithiophosphate as the anti-wear agent is 0.11. As can be seen, the eighth generation magnetic polyamidoamine compound (n=8, m=8) is a rather excellent magnetic nano anti-wear agent.

EXAMPLE 13

A ninth generation magnetic polyamidoamine compound (n=9, m=5) which has Ni&SiO$_2$ as its core was used in a diesel engine lubricating oil as a magnetic nano anti-wear agent.

According to the formula as shown in Table 21, diesel engine lubricating oil CI-4 10W-30 was formulated with the ninth generation magnetic polyamidoamine compound (n=9, m=5) as a magnetic nano anti-wear agent M (6.4 ppm of Ni and 1.2 ppm of Si), and an organic molybdenum salt anti-wear agent (e.g., molybdenum dialkyldithiophosphate) that was commonly available in the market, respectively.

TABLE 21

Formula for diesel engine lubricating oil CI-4 10W-30

| | Base oil 100N | Base oil 150N | Base oil PAO-4 | Functional additive W* | Magnetic nano anti-wear agent M | Anti-wear agent (molybdenum dialkyldithio-phosphate) |
|---|---|---|---|---|---|---|
| 13-1 wt % | 45 | 30 | 10 | 10 | 5 | — |
| 13-2 wt % | 45 | 30 | 10 | 10 | — | 5 |

Note:
W* contains an anti-wear additive, which represents zinc dialkyldithiophosphate (ZDDP).

The analysis results of diesel engine lubricating oil CI-4 10W-30 are shown as follows.

TABLE 22

Analysis results of diesel engine lubricating oil CI-4 10W-30

| Analysis item | 13-1 | 13-2 | Test method |
|---|---|---|---|
| Dynamic viscosity (100° C.), mm$^2$/s | 9.82 | 9.83 | GB/T 265 |
| Low temperature (−30° C.) dynamic viscosity, mPa · s | 5,950 | 5,955 | GB/T 6538 |
| Low temperature (−35° C.) pumping viscosity in the case of no yield stress, mPa · s | 27,000 | 27,005 | SH/T 0562 |
| Moisture (volume)% | Trace | Trace | GB/T 260 |
| Flash point (opening), ° C. | 228 | 228 | GB/T 3536 |
| High temperature high shear viscosity (150° C., 10$^6$ s$^{-1}$), mPa · s | 3.58 | 3.59 | SH/T 0703 |
| Dynamic viscosity at 100° C. after shearing in a shear test of diesel nozzle, mm$^2$/s | 9.52 | 9.51 | SH/T 0103 |
| Friction coefficient | 0.06 | 0.13 | M* |

Note:
M* pattern of friction pair: ball and disk; test conditions: 50 Hz, 200 g, and 80° C.

The analysis data in Table 22 show that the friction coefficient of the oil product CI-4 10W-30 formulated with the ninth generation magnetic nano anti-wear agent of the present disclosure is 0.06, while the friction coefficient of the oil product CI-4 10W-30 formulated with molybdenum dialkyldithiophosphate as the anti-wear agent is 0.13. As can be seen, the ninth generation magnetic polyamidoamine compound (n=9, m=5) is a rather excellent magnetic nano anti-wear agent.

EXAMPLE 14

A tenth generation magnetic polyamidoamine compound (n=10, m=4) which has γ-Fe$_2$O$_3$&SiO$_2$ as its core was used in a diesel engine lubricating oil as a magnetic nano anti-wear agent.

According to the formula as shown in Table 23, diesel engine lubricating oil CF-4 15W-40 was formulated with the tenth generation magnetic polyamidoamine compound (n=10, m=4) as a magnetic nano anti-wear agent N (7 ppm of Fe and 0.17 ppm of Si), and an organic molybdenum salt anti-wear agent (e.g., molybdenum dialkyldithiophosphate) that was commonly available in the market, respectively.

TABLE 23

Formula for diesel engine lubricating oil CF-4 15W-40

| | Base oil 100 N | Base oil 150 N | Base oil PAO-4 | Functional additive Y* | Magnetic nano anti-wear agent N | Anti-wear agent (molybdenum dialkyldithio-phosphate) |
|---|---|---|---|---|---|---|
| 14-1 wt % | 31 | 50 | 5 | 10 | 4 | — |
| 14-2 wt % | 31 | 50 | 5 | 10 | — | 4 |

Note:
Y* contains an anti-wear additive, which represents zinc dialkyldithiophosphate (ZDDP).

The analysis results of diesel engine lubricating oil CF-4 15W-40 are shown as follows.

TABLE 24

Analysis results of diesel engine lubricating oil CF-4 15W-40

| Analysis item | 14-1 | 14-2 | Test method |
|---|---|---|---|
| Dynamic viscosity (100° C.), mm$^2$/s | 14.85 | 14.83 | GB/T 265 |
| Low temperature (−30° C.) dynamic viscosity, mPa · s | 5,870 | 5,875 | GB/T 6538 |
| Low temperature (−35° C.) pumping viscosity in the case of no yield stress, mPa · s | 37,005 | 37,000 | SH/T 0562 |
| Moisture (volume)% | Trace | Trace | GB/T 260 |
| Flash point (opening), ° C. | 230 | 230 | GB/T 3536 |
| High temperature high shear viscosity (150° C., 10$^6$ s$^{-1}$), mPa · s | 3.88 | 3.89 | SH/T 0703 |
| Dynamic viscosity at 100° C. after shearing in a shear test of diesel nozzle, mm$^2$/s | 14.05 | 14.06 | SH/T 0103 |
| Friction coefficient | 0.09 | 0.13 | M* |

Note:
M* pattern of friction pair: ball and disk; test conditions: 50 Hz, 200 g, and 80° C.

The analysis data in Table 24 show that the friction coefficient of the oil product CF-4 15W-40 formulated with the tenth generation magnetic nano anti-wear agent of the present disclosure is 0.09, while the friction coefficient of the oil product CF-4 15W-40 formulated with molybdenum dialkyldithiophosphate as the anti-wear agent is 0.13. As can be seen, the tenth generation magnetic polyamidoamine compound (n=10, m=4) is a rather excellent magnetic nano anti-wear agent.

EXAMPLE 15

A sixth generation magnetic polyamidoamine compound (n=6, m=12) which has Fe$_3$O$_4$&SiO$_2$ as its core was used in a gasoline engine lubricating oil as a magnetic nano anti-wear agent.

According to the formula as shown in Table 25, gasoline engine lubricating oil SM 0W-30 was formulated with the sixth generation magnetic polyamidoamine compound (n=6, m=12) as a magnetic nano anti-wear agent P (0.3 ppm of Fe and 0.01 ppm of Si), and an organic molybdenum salt anti-wear agent (e.g., molybdenum dialkyldithiophosphate) that was commonly available in the market, respectively.

TABLE 25

Formula for gasoline engine lubricating oil SM 0W-30

| | Base oil 100N | Base oil 150N | Base oil PAO-4 | Functional additive Z* | Magnetic nano anti-wear agent P | Anti-wear agent (molybdenum dialkyldithio-phosphate) |
|---|---|---|---|---|---|---|
| 15-1 wt % | 55 | 10 | 20 | 15 | 100 ppm | — |
| 15-2 wt % | 55 | 10 | 20 | 15 | — | 100 ppm |

Note:
Z* contains an anti-wear additive, which represents zinc dialkyldithiophosphate (ZnDDP).

The analysis results of gasoline engine lubricating oil SM 0W-30 are shown as follows.

TABLE 26

Analysis results of gasoline engine lubricating oil SM 0W-30

| Analysis item | 15-1 | 15-2 | Test method |
|---|---|---|---|
| Dynamic viscosity (100° C.), mm$^2$/s | 9.952 | 9.948 | GB/T 265 |
| Low temperature (−30° C.) dynamic viscosity, mPa · s | 5,500 | 5,560 | GB/T 6538 |
| Low temperature (−35° C.) pumping viscosity in the case of no yield stress, mPa · s | 16,000 | 16,030 | SH/T 0562 |
| Moisture (volume)% | Trace | Trace | GB/T 260 |
| Flash point (opening), ° C. | 228 | 228 | GB/T 3536 |
| High temperature high shear viscosity (150° C., 10$^6$ s$^{-1}$), mPa · s | 3.25 | 3.23 | SH/T 0703 |
| Dynamic viscosity at 100° C. after shearing in a shear test of diesel nozzle, mm$^2$/s | 9.86 | 9.82 | SH/T 0103 |
| Friction coefficient | 0.06 | 0.12 | M* |

Note:
M* pattern of friction pair: ball and disk; test conditions: 50 Hz, 200 g, and 80° C.

The analysis data in Table 26 show that the friction coefficient of the oil product SM 0W-30 formulated with the sixth generation magnetic nano anti-wear agent of the present disclosure is 0.06, while the friction coefficient of the oil product SM 0W-30 formulated with molybdenum dialkyldithiophosphate as the anti-wear agent is 0.12. As can be seen, the sixth generation magnetic polyamidoamine compound (n=6, m=12) is a rather excellent magnetic nano anti-wear agent.

EXAMPLE 16

A third generation magnetic polyamidoamine compound (n=3, m=17) which has γ-Fe$_2$O$_3$&SiO$_2$ as its core was used in a gasoline engine lubricating oil as a magnetic nano anti-wear agent.

According to the formula as shown in Table 27, gasoline engine lubricating oil SN 5W-30 was formulated with the third generation magnetic polyamidoamine compound (n=3, m=17) as a magnetic nano anti-wear agent Q (2.3 ppm of Fe and 0.05 ppm of Si), and an organic molybdenum salt anti-wear agent (e.g., molybdenum dialkyldithiophosphate) that was commonly available in the market, respectively.

TABLE 27

Formula for gasoline engine lubricating oil SN5W-30

| | Base oil 100N | Base oil 150N | Base oil PAO-4 | Functional additive R* | Magnetic nano anti-wear agent Q | Anti-wear agent (molybdenum dialkyldithio-phosphate) |
|---|---|---|---|---|---|---|
| 16-1 wt % | 40 | 35 | 10 | 15 | 150 ppm | — |
| 16-2 wt % | 40 | 35 | 10 | 15 | — | 150 ppm |

Note:
R* contains an anti-wear additive, which represents zinc dialkyldithiophosphate (ZnDDP).

The analysis results of gasoline engine lubricating oil SN5W-30 are shown as follows.

TABLE 28

Analysis results of gasoline engine lubricating oil SN5W-30

| Analysis item | I | II | Test method |
|---|---|---|---|
| Dynamic viscosity (100° C.), mm$^2$/s | 10.02 | 10.03 | GB/T 265 |
| Low temperature (−30° C.) dynamic viscosity, mPa · s | 5,760 | 5,780 | GB/T 6538 |
| Low temperature (−35° C.) pumping viscosity in the case of no yield stress, mPa · s | 16,500 | 16,040 | SH/T 0562 |
| Moisture (volume)% | Trace | Trace | GB/T 260 |
| Flash point (opening), ° C. | 225 | 225 | GB/T 3536 |
| High temperature high shear viscosity (150° C., 10$^6$ s$^{-1}$), mPa · s | 3.85 | 3.82 | SH/T 0703 |
| Dynamic viscosity at 100° C. after shearing in a shear test of diesel nozzle, mm$^2$/s | 9.72 | 9.71 | SH/T 0103 |
| Friction coefficient | 0.08 | 0.12 | M* |

Note:
M* pattern of friction pair: ball and disk; test conditions: 50 Hz, 200 g, and 80° C.

The analysis data in Table 28 show that the friction coefficient of the oil product SN5W-30 formulated with the third generation magnetic nano anti-wear agent Q of the present disclosure is 0.08, while the friction coefficient of the oil product SN5W-30 formulated with molybdenum dialkyldithiophosphate as the anti-wear agent is 0.12. As can be seen, the magnetic polyamidoamine compound (n=3, m=17) is a rather excellent magnetic nano anti-wear agent.

EXAMPLE 17

A first generation magnetic polyamidoamine compound which has Fe$_3$O$_4$&SiO$_2$ as its core was used in a gasoline engine lubricating oil as a magnetic nano anti-wear agent. According to the formula as shown in Table 29, gasoline engine lubricating oil SM 5W-20 was formulated with the first generation magnetic polyamidoamine compound as a magnetic nano anti-wear agent O (10 ppm of Fe and 0.2 ppm of Si), and an organic molybdenum salt anti-wear agent (e.g., molybdenum dialkyldithiophosphate) that was commonly available in the market, respectively.

TABLE 29

Formula for gasoline engine lubricating oil SM 5W-20

| | Base oil 100N | Base oil 150N | Base oil PAO-4 | Functional additive O* | First generation magnetic nano anti-wear agent A | Anti-wear agent (molybdenum dialkyldithiophosphate) |
|---|---|---|---|---|---|---|
| 17-1 wt % | 37 | 15 | 33 | 15 | 100 ppm | — |
| 17-2 wt % | 37 | 15 | 33 | 15 | — | 100 ppm |

Note:
O* contains an anti-wear additive, which represents zinc dialkyldithiophosphate (ZnDDP).

The analysis results of gasoline engine lubricating oil SM 5W-20 are shown as follows.

TABLE 30

Analysis results of gasoline engine lubricating oil SM 5W-20

| Analysis item | 17-1 | 17-2 | Test method |
|---|---|---|---|
| Dynamic viscosity (100° C.), mm²/s | 6.98 | 7.02 | GB/T 265 |
| Low temperature (−30° C.) dynamic viscosity, mPa · s | 4,900 | 4,780 | GB/T 6538 |
| Low temperature (−35° C.) pumping viscosity in the case of no yield stress, mPa · s | 26,000 | 26,010 | SH/T 0562 |
| Moisture (volume)% | Trace | Trace | GB/T 260 |
| Flash point (opening), ° C. | 220 | 220 | GB/T 3536 |
| High temperature high shear viscosity (150° C., 10⁶ s⁻¹), mPa · s | 2.65 | 3.63 | SH/T 0703 |
| Friction coefficient | 0.08 | 0.11 | M* |

Note:
M* pattern of friction pair: ball and disk; test conditions: 50 Hz, 200 g, and 80° C.

The analysis data in Table 30 show that the friction coefficient of the oil product SM 5W-20 formulated with the first generation magnetic nano anti-wear agent O of the present disclosure is 0.08, while the friction coefficient of the oil product SM 5W-20 formulated with molybdenum dialkyldithiophosphate as the anti-wear agent is 0.11. As can be seen, the first generation magnetic polyamidoamine compound is a rather excellent magnetic nano anti-wear agent.

EXAMPLE 18

Figure 4:
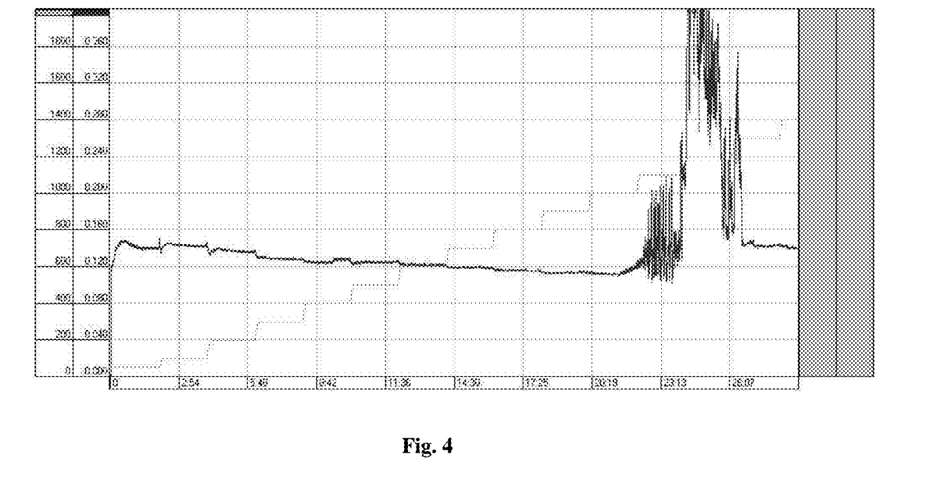
FIG. 4 shows a multifunctional friction and wear test diagram of a fifth generation magnetic polyamidoamine compound (m=12) with $Fe_3O_4\&SiO_2$ as its core of present disclosure.
Figure 5:
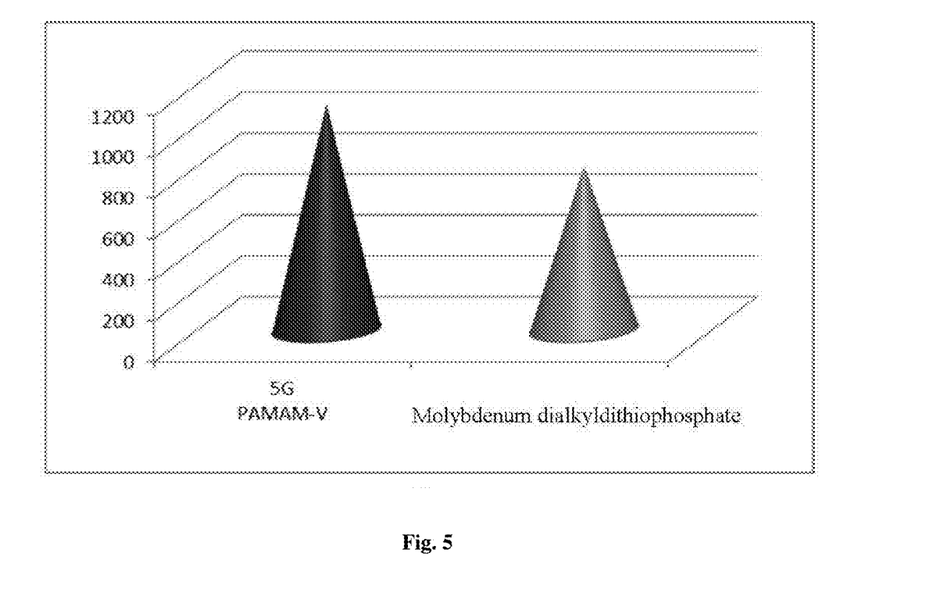
FIG. 5 shows a comparison diagram between extreme pressure performance of a fifth generation polyamidoamine anti-wear agent (m=12) with $Fe_3O_4\&SiO_2$ as its core, and that of molybdenum dialkyldithiophosphate.

A fifth generation magnetic polyamidoamine compound which has γ-Fe₂O₃&SiO₂ as its core was dissolved into a 100 N base oil and was tested for its anti-wear performance with an SRV. The results thereof were shown in FIG. 4, which indicated that as the load increased, the friction coefficient slightly decreased and became stable around 0.119. This was because an oil film on a surface of a friction pair formed gradually and became stable. As can be indicated, the fifth generation polyamidoamine compound had excellent anti-wear performance. When the load was added to be 1,100 N, the friction coefficient rose sharply. This was because the oil film on the surface of the friction pair broke and became functionless as a lubricant. However, at the same conditions, for a commonly used organic molybdenum salt, such as molybdenum dialkyldithiophosphate, the oil film on the surface of the friction pair thereof would break (see FIG. 5) when the load was increased to 800 N. This indicated that the fifth generation magnetic polyamidoamine compound had excellent extreme pressure performance.

While the present disclosure has been described with general explanations and specific examples, these examples can be modified or improved based on the present disclosure, which is rather obvious for those skilled in the art. Therefore, modification or improvement performed within the spirit of the present disclosure fall within the scope of the present disclosure.

The invention claimed is:

1. A magnetic dendrimer compound, having a molecular formula as shown in formula (I):

$$\Gamma(CH_2)_3 N_{(2^{n+1}-1)} R^1_{(2^{n+2}-2)} R^2_{(2^{n+1})} \quad (I),$$

wherein Γ indicates a magnetic particle coated with SiO₂ on a surface thereof, the magnetic particle having been modified by a silane coupling agent, wherein $(CH_2)_3 N_{(2^{n+1}-1)} R^1_{(2^{n+2}-2)}$ is a dendritic group, and wherein $R^2_{(2^{n+1})}$ is a lipophilic group, with $0 \leq n \leq 100$, wherein R¹ is selected from polyamido-amine dendrimers having a repetitive structure unit as shown in formula (II):

$$-(CH_2)_2 CONH(CH_2)_2 NH- \quad (II).$$

2. The magnetic dendrimer compound according to claim 1, wherein the magnetic particle is a magnetic nanoparticle.

3. The magnetic dendrimer compound according to claim 1, wherein $0 \leq n \leq 10$.

4. The magnetic dendrimer compound according to claim 1, wherein the magnetic particle comprises at least one selected from a group consisting of Fe₃O₄, Ni, and γ-Fe₂O₃.

5. The magnetic dendrimer compound according to claim 1, wherein the magnetic particle is selected from core-shell Fe₃O₄&SiO₂ magnetic nanoparticles coated with SiO₂ on an outer shell thereof, said magnetic particles having been modified by a silane coupling agent.

6. The magnetic dendrimer compound according to claim 1, wherein the silane coupling agent is 3-aminopropyl triethoxysilane, 3-glycidyloxypropyl trimethoxysilane, or 3-aminopropyl trimethoxysilane.

7. The magnetic dendrimer compound according to claim 1, wherein R² is selected from a group consisting of linear or branched C₁₋₁₈ alkyls.

8. A method for preparing the magnetic dendrimer compound according to claim 1, comprising the following steps:
step i): providing a magnetic particle coated with SiO₂;
step ii) modifying a surface of the magnetic particle with a silane coupling agent, and reacting the modified product with a dendrimer, so as to bond the dendrimer to the magnetic nanoparticle; and
step iii) reacting a product of the dendrimer bonded to the magnetic nanoparticle that has been obtained in step ii) with a compound having a lipophilic group, to produce the magnetic dendrimer compound.

9. The method according to claim 8, wherein the compound having a lipophilic group is a halohydrocarbon.

10. An anti-wear additive for lubricating oils, the anti-wear additive comprising the magnetic dendrimer compound according to claim 1.

11. A lubricant comprising the magnetic dendrimer compound according to claim 1.

12. The lubricant according to claim 11, wherein the content of the magnetic dendrimer compound in the lubricant is in the range from 100 ppm to 5% by weight.

13. The lubricant according to claim 11, wherein the content of Fe and/or Ni in the lubricant is in the range from 0.01 ppm to 0.20% by weight.

14. The lubricant according to claim 11, wherein the content of Si in the lubricant is in the range from 0.01ppm to 0.20% by weight.

15. The lubricant according to claim 11, wherein the magnetic dendrimer compound is selected from magnetic polyamido-amine compounds as shown in formula (III):

$$\Gamma(CH_2)_3N_{(2^{n+1}-1)}[(CH_2)_2CONH(CH_2)_2NH]_{(2^{n+2}-2)}(C_mH_{2m+1})_2{}^{n+1} \quad (III),$$

wherein $\Gamma$ represents a magnetic particle coated with $SiO_2$ on a surface thereof, the magnetic particle having been modified by a silane coupling agent, wherein $(CH_2)_3N_{(2^{n+1}-1)}R^1{}_{(2^{n+2}-2)}$ is a dendritic group, and wherein $(C_mH_{2m+1})_2{}^{n+1}$ is a lipophilic group, with $0 \leq n \leq 10$, and $1 \leq m \leq 18$.

16. The lubricant according to claim 15, wherein in the magnetic polyamido-amine compound, n is an integer selected from 5-9, and m is an integer selected from 9-13.

17. The method according to claim 8, wherein the compound having a lipophilic group is a haloalkane.

18. The lubricant according to claim 11, wherein the content of Fe and/or Ni in the lubricant is in the range from 0.01 ppm to 429 ppm by weight.

19. The lubricant according to claim 11, wherein the content of Si in the lubricant is in the range from 0.01 to 20.1 ppm by weight.

20. A lubricant comprising a magnetic dendrimer compound having a molecular formula as shown in formula (I):

$$\Gamma(CH_2)_3N_{(2^{n+1}-1)}R^1{}_{(2^{n+2}-2)}R^2{}_{(2^{n+1})} \quad (I),$$

wherein $\Gamma$ indicates a magnetic particle coated with $SiO_2$ on a surface thereof, the magnetic particle having been modified by a silane coupling agent, wherein $(CH_2)_3N_{(2^{n+1}-1)}R^1{}_{(2^{n+2}-2)}$ is a dendritic group, and wherein $R^2{}_{(2^{n+1})}$ is a lipophilic group, with $0 \leq n \leq 100$, wherein the content of the magnetic dendrimer compound in the lubricant is in the range from 100 ppm to 5% by weight.

21. A lubricant comprising a magnetic dendrimer compound having a molecular formula as shown in formula (I):

$$\Gamma(CH_2)_3N_{(2^{n+1}-1)}R^1{}_{(2^{n+2}-2)}R^2{}_{(2^{n+1})} \quad (I),$$

wherein $\Gamma$ indicates a magnetic particle coated with $SiO_2$ on a surface thereof, the magnetic particle having been modified by a silane coupling agent, wherein $(CH_2)_3N_{(2^{n+1}-1)}R_{(2^{n+2}-2)}$ is a dendritic group, and wherein $R^2{}_{(2^{n+1})}$ is a lipophilic group, with $0 \leq n \leq 100$, wherein the content of Fe and/or Ni in the lubricant is in the range from 0.01 ppm to 0.20% by weight.

22. A lubricant comprising a magnetic dendrimer compound having a molecular formula as shown in formula (I):

$$\Gamma(CH_2)_3N_{(2^{n+1}-1)}R^1{}_{(2^{n+2}-2)}R^2{}_{(2^{n+1})} \quad (I),$$

wherein $\Gamma$ indicates a magnetic particle coated with $SiO_2$ on a surface thereof, the magnetic particle having been modified by a silane coupling agent, wherein $(CH_2)_3N_{(2^{n+1}-1)}R^1{}_{(2^{n+2}-2)}$ is a dendritic group, and wherein $R^2{}_{(2^{n+1})}$ is a lipophilic group, with $0 \leq n \leq 100$, wherein the content of Si in the lubricant is in the range from 0.01% to 0.20% by weight.

23. A lubricant comprising a magnetic dendrimer compound selected from magnetic polyamido-amine compounds as shown in formula (III):

$$\Gamma(CH_2)_3N_{(2^{n+1}-1)}[(CH_2)_2CONH(CH_2)_2NH]_{(2^{n+2}-2)}(C_mH_{2m+1})_2{}^{n+1} \quad (III),$$

wherein $\Gamma$ represents a magnetic particle coated with $SiO_2$ on a surface thereof, the magnetic particle having been modified by a silane coupling agent, wherein $(CH_2)_3N_{(2^{n+1}-1)}R^1{}_{(2^{n+2}-2)}$ is a dendritic group, and wherein $(C_mH_{2m+1})_2{}^{n+1}$ is a lipophilic group, with $0 \leq n \leq 10$, and $1 \leq m \leq 18$.

* * * * *